United States Patent [19]
Fortunato et al.

[11] Patent Number: 4,718,765
[45] Date of Patent: Jan. 12, 1988

[54] INTERFEROMETRIC GAS DETECTOR

[75] Inventors: Gérard Fortunato, Lyons; André Galais, Paris; Dominique Laurent, Lyons, all of France

[73] Assignee: ELF France, Paris, France

[21] Appl. No.: 746,648

[22] Filed: Jun. 20, 1985

[30] Foreign Application Priority Data

Jun. 22, 1984 [FR] France .................. 84 09882

[51] Int. Cl.$^4$ ............................. G01B 9/02
[52] U.S. Cl. ......................... 356/346; 356/352
[58] Field of Search ............ 356/346, 361, 352

[56] References Cited
FOREIGN PATENT DOCUMENTS 2555748 5/1985 France ................. 356/346

Primary Examiner—Davis L. Willis
Assistant Examiner—Matthew W. Koren
Attorney, Agent, or Firm—Schwartz, Jeffery, Schwaab, Mack, Blumenthal & Evans

[57] ABSTRACT

Selective modulation interferometric detector, intended for specifically detecting and/or identifying at least one gas in a gaseous mixture, especially with the aim of carrying out analysis and/or proportioning operations, the assembly E consists of a first strip $L_1$ of interferometric quality having plane and parallel faces, of thickness e and index n introducing a displacement $\Delta=2ne$ adapted to the gas to be analyzed, this strip $L_1$ supplying on the detector a brilliant fringe, and a second strip $L_2$ made of the same material as the first strip $L_1$ which is slightly prismatic and supplying on the detector average illumination.

3 Claims, 2 Drawing Figures

INTERFEROMETRIC GAS DETECTOR

FIELD OF THE INVENTION

The present invention concerns a gas detector operating through interferometry intended for detecting and identifying at least one gas in a gaseous mixture, especially with the aim of conducting analysis and/or proportioning operations.

The applicant has already divulged a gas detector in French patent application filed under No. 83 19011 dated Nov. 29, 1983.

The detector described in this previous application is a selective modulation detector and essentially comprises a light source, the beam of which crosses successively through a concentration aperture, a gas tank, an interference filter intended to isolate the whole of the specific band and an interferometry and modulation assembly prior to reaching a detection cell, the interferometry and detection assembly consisting of a Fabry-Perot interferometer of which at least one of the strips or plates is mounted on piezoelectric strips subjected to electric modulation voltage. Therefore, the interferometer is constituted by two parallel-faced plates, the opposite faces of which are covered with a thin layer, the modulation of the interference phenomenon is ensured by the longitudinal vibration of the piezoelectric ceramic strips.

This device is particularly suitable for laboratory requirements, but it is less appropriate for industrial application since it has the drawback of being acutely sensitive to vibration.

The present invention concerns an interferometric gas detector which is much less sensitive to vibration and because of this fact is much better adapted to industrial applications than the known device described above.

The detector according to the invention, intended for detecting and/or specifically identifying at least one gas in a gaseous mixture, especially with the aim of conducting analysis and/or proportioning operations, particularly for industrial applications, comprising, aligned on a single axis, a light source S, an interference filter F intended to isolate the whole of the specific absorption band of the gas to be identified, a gas tank C, an optical focusing system $O_1$, $O_2$ an interferometry and modulation assembly E, and a detector D, the said optical system being intended to form the image of the source S on the said detector D through the filter F, the tank C and the assembly E, wherein the assembly E consists of a first plate $L_1$ of interferometric properties and having plane and parallel faces, of thickness e and index n introducing a path difference $\Delta = 2ne$ adapted to the gas to be analyzed, this plate $L_1$ supplying on the detector D a brilliant fringe, and a second plate $L_2$, made of the same material as the first plate $L_1$, forming a slight prism with respect to the previous one and supplying on the detector an average illumination or lighting, the whole comprising, furthermore, a rotary modulation disk opposite the plates, bored by a window in order to uncover and cover alternately each of these two plates and thus to provoke the modulation of signal s supplied by the detector D.

BRIEF DESCRIPTION OF THE DRAWINGS

The objects, features and advantages of the present invention will become apparent from reading the following description, given by way of non-limitative illustration, with reference to the appended drawings in which.

DETAILED DESCRIPTION OF A REFERRED EMBODIMENT

Figure 1:
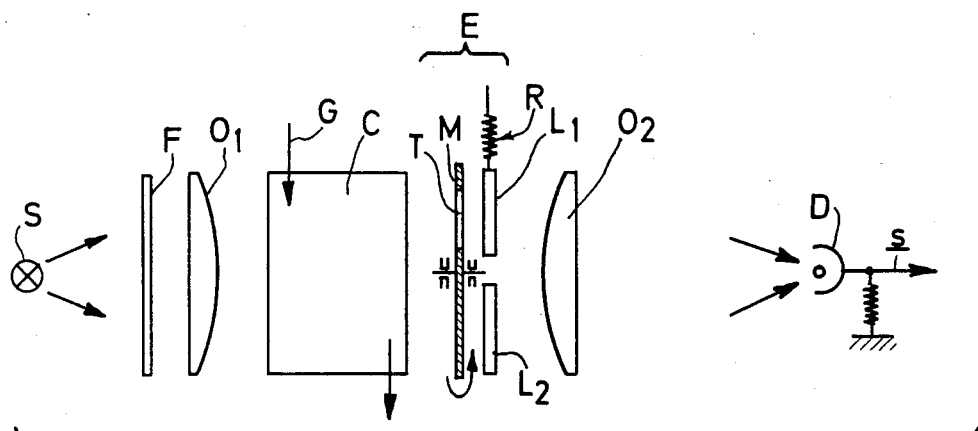
FIG. 1 is a schematic view of an embodiment of the interferometric detector according to the invention.
Figure 2:
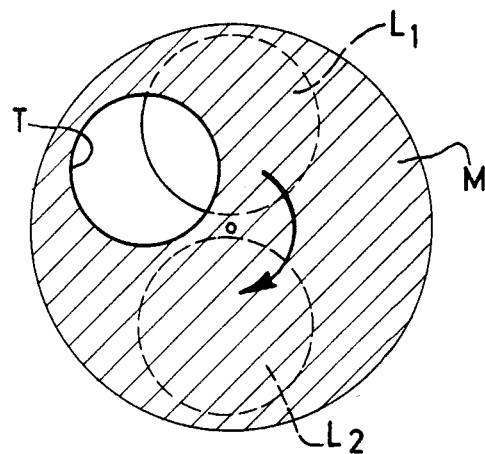
FIG. 2 is a frontal view, on a greater scale, of the modulation assembly of the detector represented in FIG. 1.

In the embodiment selected and represented, the detector according to the invention comprises a light source S, a gas tank C as well as an interference filter F that isolates the whole of the specific absorption band of the gas to be detected. The light issuing from the light source S is reflected through the filter F, the tank C and an interferometer-modulator assembly E which will be further described herein-below, and focused on a detector D by means of an optical system comprising two objectives $O_1$ and $O_2$.

According to the invention, the interferometer of the assembly E is constituted by two plates $L_1$ and $L_2$. Plate $L_1$ is a strip of material presenting interferometric properties and with plane and parallel faces thickness e and index of refraction n creating a path difference $\Delta = 2ne$, adapted to the gas G to be analyzed. In addition, note that the gas crosses through tank C in the conventional way.

The adjustment of the device is such that the plate $L_1$ supplies a brilliant fringe on detector D, which is possible to obtain by adjusting, for example, the temperature of the plate $L_1$, by means of a device R, thereby modifying the index n of this plate. Plate $L_2$ is a plate made of the same material as plate $L_1$, but of a current quality, this plate $L_2$ being slightly prismatic so as not to create any interference phenomenon ad infinitum as is the case with the parallel faces of $L_1$, but so as to supply the detector D with average illumination. Plates $L_1$ and $L_2$ are substantially disposed in the same plane, perpendicular to the axis of the detector, symmetrically with respect to the intersection of this plane and this axis.

Assembly E comprises, furthermore, a modulator disk M, opaque and mounted in rotation around the axis of the detector, this disk being bored by a hole T that alternately uncovers plates $L_1$ and $L_2$.

Therefore, during the time that $L_1$ is illuminated, there will be a maximum illumination on the detector, corresponding to the brilliant fringe, and during the time that $L_2$ is illuminated, average illumination.

Signal s delivered by the detector is thus modulated at the rotation frequency of the disk M, in the presence of the fringes.

The two plates $L_1$ and $L_2$ are made of the same material, for example, ZnS, ZnSe, Ge, $CaF_2$.

When this material has a high index such as is the case for the first three compounds mentioned above, the deposit of a thin layer, intended to improve power reflection is not necessary.

The detector according to the invention is only very slightly sensitive to external vibration and is thus particularly well adapted to industrial application.

It is well understood that the present invention is in no way limited to the embodiments described and represented herein-above and it is adaptable to numerous variants available to the man skilled in the art without departing from the scope and spirit of the invention.

What is claimed is:

1. An interferometric gas detector intended for detecting and/or specifically identifying at least one gas in a gaseous mixture, comprising:
   aligned on a single axis,
   a light source,
   an interference filter for isolating a specific absorption band of the at least one gas to be identified,
   a gas tank,
   an optical focusing system,
   an interferometry and modulation assembly, and
   a detector,
   said optical system forming an image of said source on said detector through said filter, said tank and said interferometry and modulation assembly,
   wherein said interferometry and modulation assembly includes:
   a first plate of a material for supplying a brilliant fringe on said detector, said first plate having planar parallel faces for introducing a path difference $\Delta = 2ne$, wherein e is the thickness and n is the index of refraction of said first plate, whereby the absorption band of the at least one gas is equal to an absorption maxima of said first plate,
   a second plate, in the same plane as said first plate and made of the same material as said first plate, having planar faces that form a prism for supplying an average illumination on said detector, and
   a rotary modulation disk rotating opposite the planar faces of said first and second plates, said rotary disk having a window for permitting light from said light source to pass through the window wherein the light is alternately passed through said first and second plate as the window rotates.

2. A detector according to claim 1, wherein said first and second plates are selected from the group consisting of ZnS, ZnSe, Ge or $CaF_2$.

3. A detector according to claim 1, wherein a heating device is associated with said first plate in order to modify its index n.

* * * * *